(No Model.) 10 Sheets—Sheet 1.

F. H. PAINE.
DEPTH REGULATING MECHANISM FOR MARINE TORPEDOES AND OTHER VESSELS.

No. 478,813. Patented July 12, 1892.

Fig. 1.

Witnesses

Inventor
Frederick H. Paine
By his Attorney
Woodbury Lowery (No Model.)  
10 Sheets—Sheet 6.

F. H. PAINE.
DEPTH REGULATING MECHANISM FOR MARINE TORPEDOES AND OTHER VESSELS.

No. 478,813.  
Patented July 12, 1892.

Fig. 6.

Witnesses  
Inventor  
Frederick H. Paine  
By his Attorney Woodbury Lowery

(No Model.)

F. H. PAINE.
DEPTH REGULATING MECHANISM FOR MARINE TORPEDOES AND OTHER VESSELS.

No. 478,813.

Patented July 12, 1892.

Witnesses
Inventor
Fredrick H. Paine
By his Attorney Woodbury Lowery

UNITED STATES PATENT OFFICE.

FREDERICK HENRY PAINE, OF PARIS, FRANCE, ASSIGNOR TO THE HOTCHKISS ORDNANCE COMPANY, LIMITED, OF LONDON, ENGLAND.

DEPTH-REGULATING MECHANISM FOR MARINE TORPEDOES AND OTHER VESSELS.

SPECIFICATION forming part of Letters Patent No. 478,813, dated July 12, 1892.

Application filed March 26, 1892. Serial No. 426,594. (No model.)

*To all whom it may concern:*

Be it known that I, FREDERICK HENRY PAINE, a citizen of the United States, residing at Paris, France, have invented new and useful Improvements in Depth-Regulating Mechanism for Marine Torpedoes and other Vessels, of which the following is a specification.

My invention relates to what are known as "self-propelling torpedoes," in which the torpedo is driven by a propeller actuated by a motor and an immersion device by which the torpedo is caused to reach and maintain itself at a determinate depth in the water after launching.

My invention relates more particularly to depth-regulating mechanism by which the torpedo is caused to reach and maintain a predetermined depth in the water by automatically varying the action of its immersion-rudder, to the pendulum-immobilizing connection between the speed-regulator and immersion device, whereby the latter is automatically locked and released by the former, and to various details of the same, hereinafter more fully set forth.

For the purposes of this specification I have shown my invention as applied to a self-propelling torpedo in which the motive power is derived from a fly-wheel such as described and shown in Letters Patent No. 121,052, granted John A. Howell, dated November 21, 1871—to wit, a fly-wheel to which a very rapid movement of rotation is imparted by any power extraneous to the torpedo—and I have shown the motor and depth-regulating devices located in the same order and relation to each other as in Letters Patent No. 311,325, granted the aforesaid John A. Howell January 27, 1885, for a marine torpedo; but I do not limit myself to their use with such a motor or in such relation, as the depth-regulating, immobilizing, or other devices may be used either separately or in combination with any motor. Neither do I limit myself to their use in a marine torpedo, as the said devices may be used either separately or in combination in all vessels in which such requirements may arise.

The various disturbing influences to which a marine torpedo is subject on launching and after having reached the water which my invention is designed to counteract—such as the vertical deflection of the torpedo from its proper course at the desired depth, the rolling of a torpedo propelled by gyroscopic force, and the shock given the delicate mechanism of the immersion device on its discharge and on its first striking the water—will be more fully described in connection with the particular devices for counteracting the same.

In the accompanying drawings, which illustrate my invention.

Figure 1:
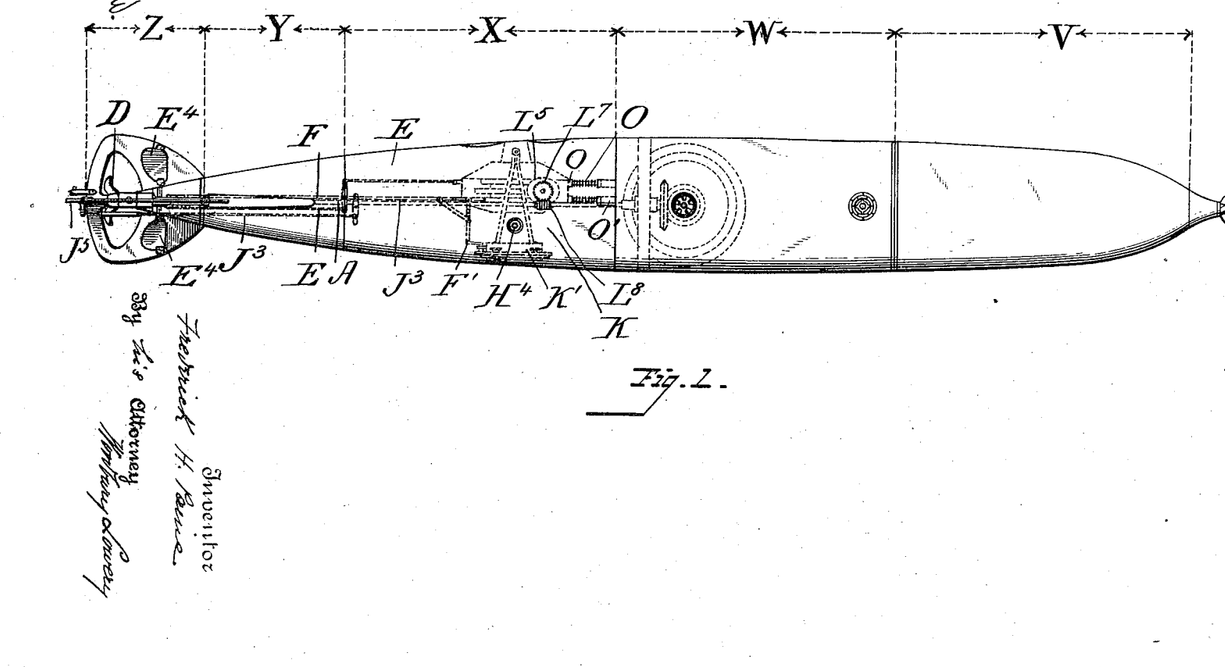
Figure 1 is a side elevation of a "fly-wheel torpedo," giving a general view of the location of the various parts of my invention.

Fig. 1 illustrates a torpedo which may be considered for the purposes of this description as consisting of four sections—viz., the charge-section or head V, which may be fitted either for service or practice in a well-known way; the middle section W, which contains the motor, represented in this instance by a Howell "fly-wheel," (shown in the drawings in dotted lines,) and having a clutch connection to its axle through a stuffing-box in the torpedo-shell, as more fully described in the Letters Patent above referred to, the middle section being also fitted with the necessary appliances for sighting the torpedo at the end of a practice run and with a suitable automatic vertical profile register of the torpedo's course under water; the after section X, which contains the immersion-regulator, with its pendulum-immobilizer attachment and rod connection to speed-regulator, tiller-rods and rod connections to tail-section, and steady bearings of propeller-shafts; finally, the tail-section Y, which consists of the tail-frame, cone, shaft-sleeves, and stuffing-boxes, (reached from the outside of the torpedo,) the fins, and rudder-frame. It also contains the speed-regulator, after-shaft bearings, propellers, and rudders. The cone Z is secured to the tail bulk-head of the tail-section, and the shaft-sleeves are secured to the tail-section. The bulk-head has small stuffing-boxes for the tiller-rods and the rod from the pitch-frame.

Figures 2, 14, 15:
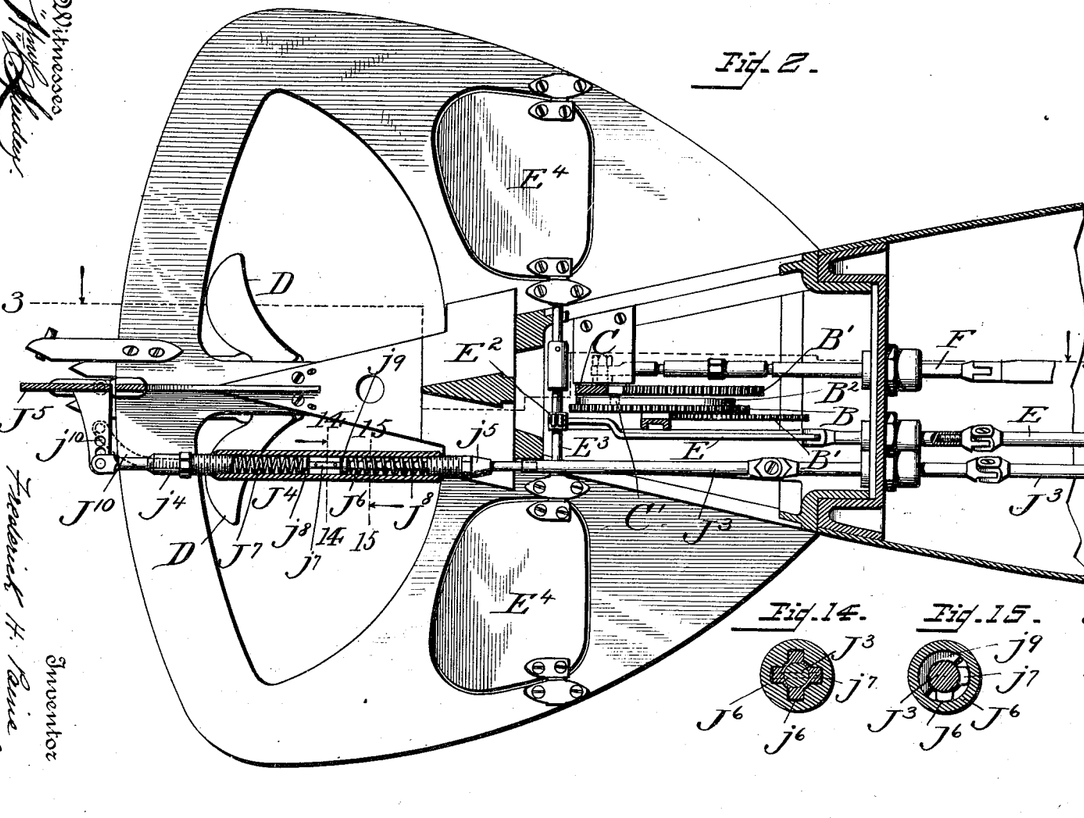
Fig. 2 is a vertical longitudinal section of the tail of the torpedo on the line 2 2 of Fig. 3, showing the speed-regulating mechanism.
Figs. 14 and 15 are detail cross-sections of the horizontal or immersion rudder spring connection on the lines 14 14 and 15 15, respectively, of Fig. 2.
Figure 3:
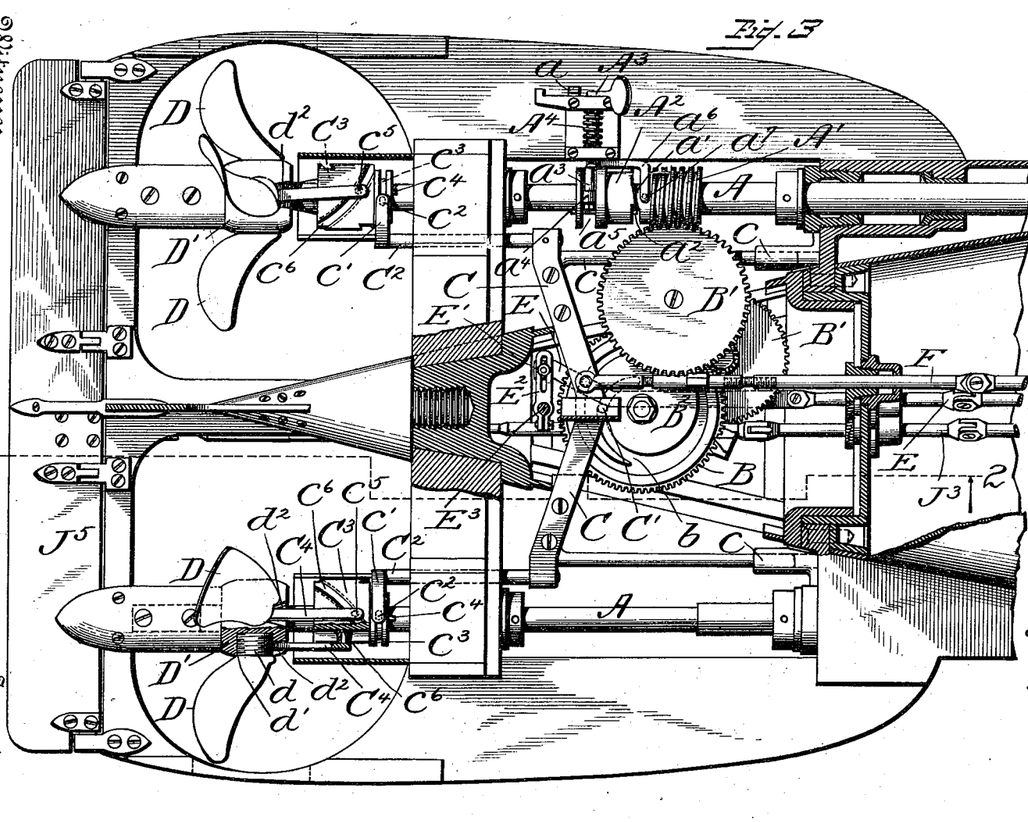
Fig. 3 is a horizontal longitudinal section of the same on the line 3 3 of Fig. 2.
Figure 4:
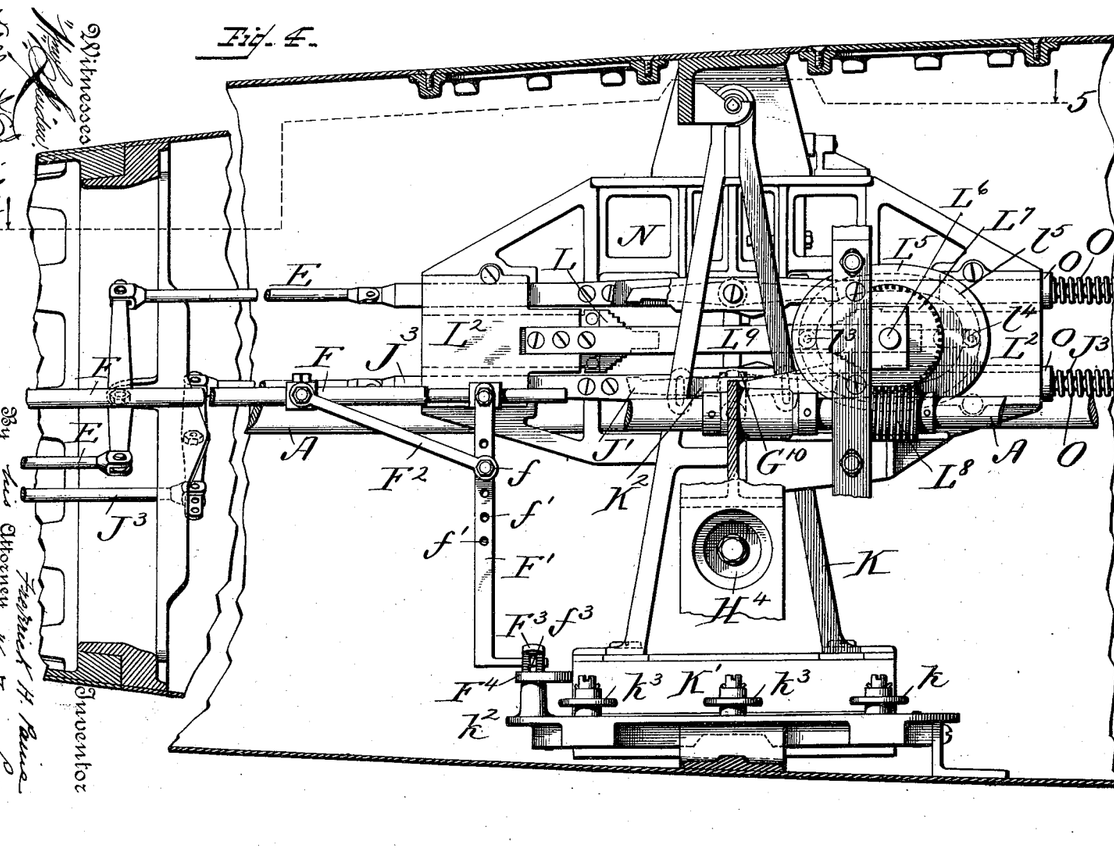
Fig. 4 is a vertical longitudinal section of the after section of the torpedo, showing the immersion-regulating device.

The speed-regulating mechanism described and claimed in my application, Serial No. 426,595, filed March 26, 1892, (shown in Figs. 2 and 3,) is located in the tail-section of the torpedo in a chamber open to the passage of the water, part of its mechanism being exterior to the torpedo-shell, as indicated in Fig. 1. It consists, essentially, of a moving frame, called a "pitch-frame," connected with the propeller-blades, which are revolubly mounted in their hubs in such wise that a movement of the frame varies the pitch of the propeller-blades. The frame is actuated by a stud engaging in a cam-groove of a cam-plate, the gear of which is automatically thrown into engagement with the torpedo-shaft on the torpedo striking the water. The angle of the cam-groove is so proportioned to the decreasing speed of revolution of the propeller-shaft that the pitch-frame in following the groove proportionately increases the pitch of the propeller-blades, and thus maintains the original speed of the torpedo.

A A are the propeller-shafts.

$A'$ is a worm loosely mounted upon one of the shafts and having clutch-jogs $a'$ at one end.

$A^2$ is a clutch-collar mounted on a collar $a^2$ on the propeller-shaft A and turning with the latter, but having a longitudinal motion on the feather, so as to be thrown in and out of engagement with the clutch on the worm $A'$.

$A^3$ is a trigger with an enlarged disk-shaped head mounted in suitable bearings on the horizontal fin and having an eccentric shank $a^3$, which works in a square-faced collar $a^4$ in a groove $a^5$ on the clutch-collar $A^2$, and a second arm $a^6$, having a post $a^7$, which fits in a socket in the worm $A'$, preventing the latter from turning when the trigger is held forward by the spring $A^4$ on its shank.

$a$ is a spring-catch to hold the trigger when thrown back.

B is a cam-gear having a removable cam-plate $B^2$, with a cam-groove $b$, and is operated by the worm $A'$ through the gears $B'$ $B'$.

C is the horizontally-moving pitch-frame, sliding in suitable bearings $c$ $c$, secured to the tail-section and having a stud $C'$, which engages with the eccentric cam-groove $b$ of the cam $B^2$. Rods $C^2$ $C^2$, extending from the pitch-frame C, are provided at their outer extremities with a pitchfork $c'$, having studs $c^2$, which engage with grooves $c^3$ in the cam-collars $C^3$, which are mounted and slide longitudinally on feathers $c^4$ on the propeller-shafts A A. The cam-collars $C^3$, which have flat sides, one for each of the propeller-blades D, are connected to the latter by the blade-lever $C^4$, one end of which has a post $c^5$, traveling in a transverse groove $c^6$ in the cam-collar side, while the other end is securely fastened into the base of the propeller-blade D. The latter, which are screw-threaded at their base $d$, screw into their seats $d'$ in the hub $D'$, so that each blade is free to turn about its pitch axis according as the blade-levers $C^4$ are moved by the cam-collar grooves $c^6$. The hub $D'$ is cut out to allow for the angular throw of the blade-levers $C^4$, as shown at $d^2$.

The operation of the speed-regulating mechanism is as follows: When the torpedo is placed in the tube ready for launching, the trigger $A^3$ is held forward by its spring $A^4$, and all of the mechanism is in the position shown in Figs. 2 and 3, with the worm $A'$ disconnected from the clutch-collar $A^2$, and therefore unaffected by the revolution of the propeller-shaft. The cam-gear B and pitch-frame C are at rest and the propeller-blades D turned to their set pitch. When the torpedo enters the water, the trigger $A^3$ is thrown back by the impact of the disk-head on the water and the trigger catches in the spring-catch $a$. The turning of the trigger withdraws its arm $a^6$ from the socket in the worm $A'$ and simultaneously its eccentric shank $a^3$ throws forward the clutch-collar $A^2$ into engagement with the worm $A'$. This in turn sets the gear B $B'$ in operation and the pitch-frame C, being conducted slowly back by the progress of its stud $C'$ in the cam-groove $b$ of the cam-gear B, pushes the revolving cam-collars $C^3$ toward the propeller-hubs $D'$, thereby moving the blade-arms $C^4$ and turning the blades D to a higher pitch as the speed of the propeller-shaft decreases.

F is a rod connection between the pitch-frame C and the pendulum-immobilizer or locking device of the immersion-regulating device, which I will now proceed to describe.

The immersion-regulating mechanism, which, as before stated, is contained in the after section of the torpedo and is illustrated in Figs. 4 to 13 of the drawings, consists, essentially, of a piston, which determines by hydrostatic pressure the depth of immersion of the torpedo, a pendulum, which controls the vertical angle of the torpedo's course, and an impulse-rack and a pallet, which latter, actuated by the piston and pendulum, either singly or jointly, as the case may be, imparts to the driving-rudders by means of the rack an impulse and direction proportionate to the the deflection of the torpedo either above or below the required depth to restore it to its proper course.

Figure 5:
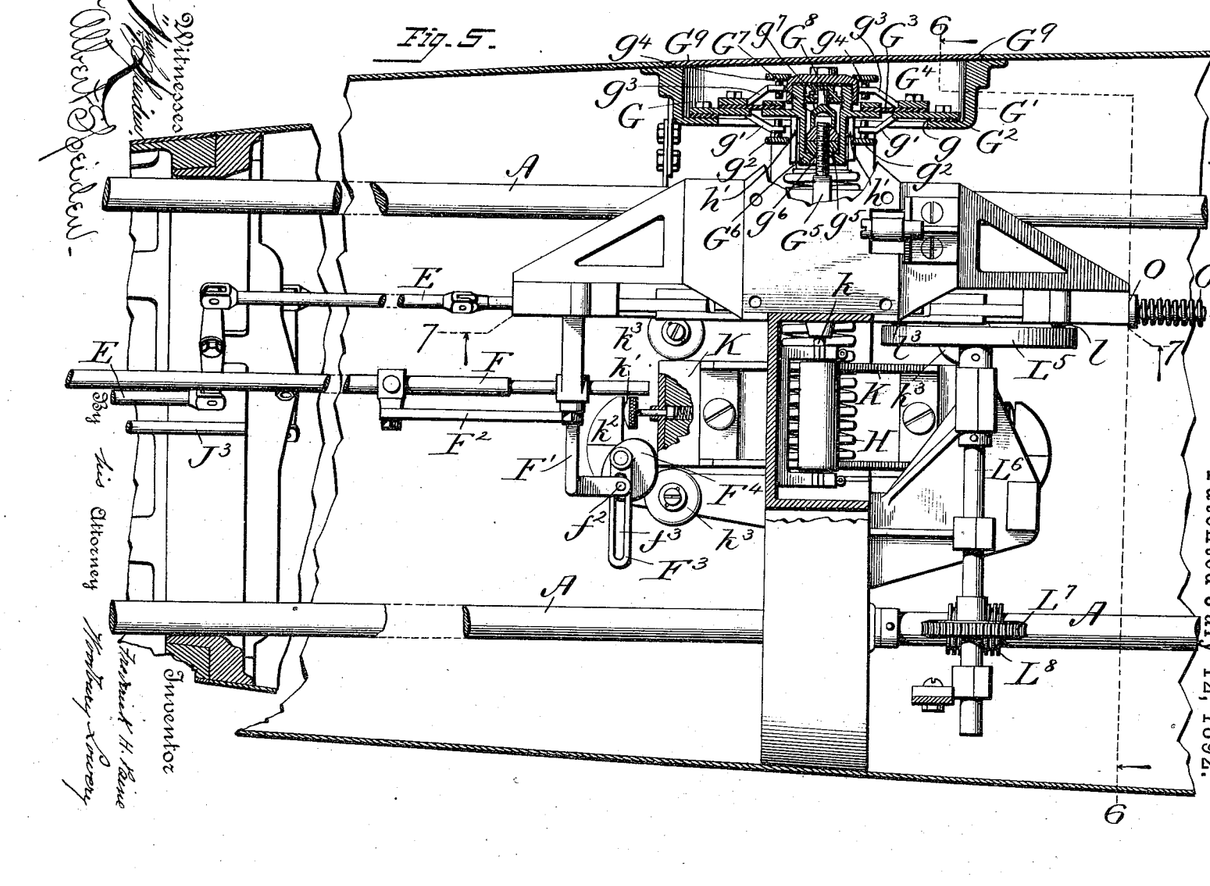
Fig. 5 is a top plan view, partly in cross-section, of the same on the line 5 5 of Fig. 4.
Figure 6:
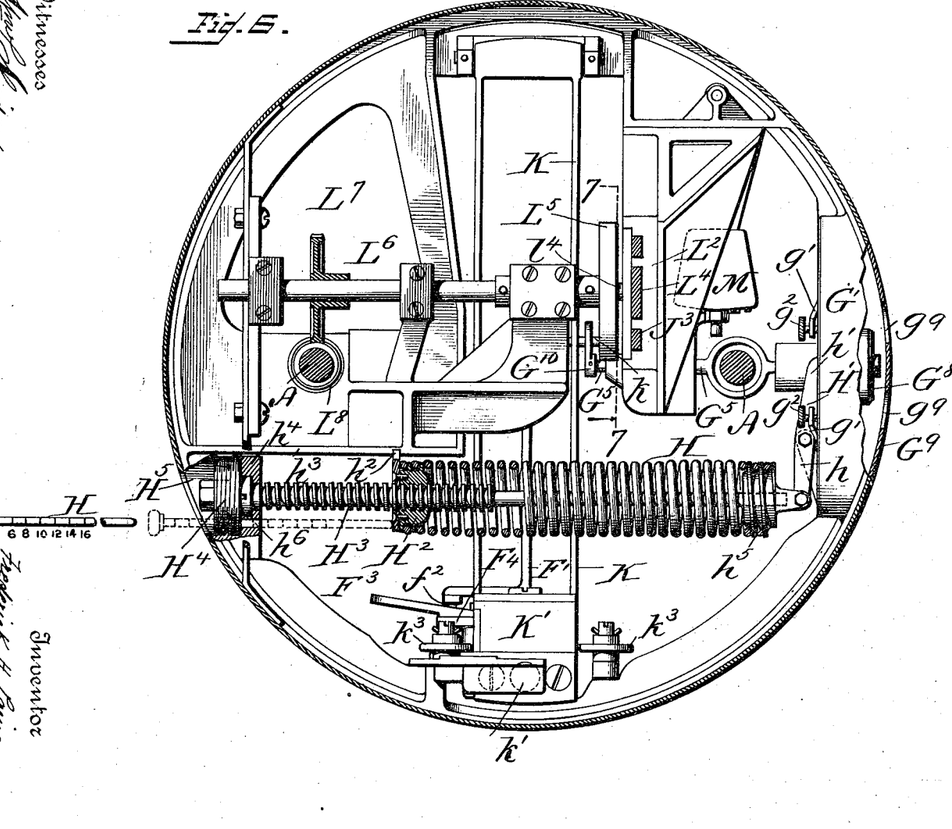
Fig. 6 is a vertical cross-section of the same on the line 6 6 of Fig. 5.

G, Figs. 5 and 6, is the hydrostatic piston in a piston-chamber, preferably located in or near the cylindrical or middle body of the torpedo.

G' is the piston-socket, having an inner ring $G^2$ bolted to the socket with a water-tight rubber washer $g$. Three arms $g'$ $g'$ $g'$, secured to the ring $G^2$, carry the inner adjustment-screws $g^2$ $g^2$ $g^2$.

$G^3$ is the elastic diaphragm, held in place by the outer ring $G^4$, on which are three arms $g^3$ $g^3$ $g^3$, which carry the outer adjustment-screws $g^4$ $g^4$ $g^4$. The adjustment-screws $g^3$ $g^4$ limit the throw of the piston in and out and also permit of the adjustment of the piston-rod $G^5$ in relation to its longitudinal movement. The piston-rod $G^5$ is attached to the diaphragm $G^3$ in the following manner, which permits the rod to turn freely, even if a little out of line, while at the same time partaking of the movement of the diaphragm: A split ball-nut $g^5$ on the end of the piston-rod $G^5$ fits into a cylindrical socket-case $G^6$, supported in the center of the diaphragm $G^3$ and having a flared opening $g^6$ to allow of a lateral play of the piston-rod. A hollow cup $G^7$, attached to a nut $g^7$, screws down within the socket-case $G^6$ and over the split nut $g^5$ on the piston-rod $G^5$, thus forming a ball-and-socket joint between the rod and diaphragm and prevents a longitudinal outward movement of the piston-rod, except as following the movement of the piston. A cap $G^8$, with a suitable washer, screws down over the top of the socket-case $G^6$ to prevent the entrance of water at this point. Over the piston-chamber a cap $G^9$, with apertures $g^9$ $g^9$, is formed as a continuation of the cylindrical body of the torpedo, in order to receive the full pressure due to the depth of immersion. The piston is easy to dismount, adjust, and inspect.

In order to set the piston G and piston-rod $G^5$ to the middle normal position for the predetermined depth at which the torpedo is to run, I provide the spring H, Fig. 6, secured at the inner extremity to one arm $h$ of the pivoted lever H', the other bifurcated arm $h'$ of which presses against the piston G. The outer end of the spring is secured to a nut $H^2$, through which passes a screw-threaded adjusting-rod $H^3$, which stretches or slackens the spring H by screwing through the nut $H^2$. The nut is prevented from turning by a notch $h^2$ in its side, which slides along the guide $h^3$ above it.

$h^4$ $h^5$ are bearings in which the adjusting-rod $H^3$ is free to turn. A water-tight screw and washer $H^4$, accessible from the exterior of the cylinder, are screwed into the chamber $H^5$ after the adjusting-rod $H^3$. The spring H is set at a tension to correspond with the pressure exerted on the piston G' by the column of water, due to the pretermined depth, and consequently holds the piston at its outward position by means of the lever H' until the hydrostatic pressure equals the spring-tension and brings the piston to its middle normal position.

In order to determine for what depth the spring-tension has been set, I provide an aperture $h^6$, covered by the removable cap $H^4$, through which a marked gage $H^6$ can be passed and brought up against the nut $H^2$ of the spring. The gage is marked for the tension at that point. In case a spring alters its tension with time, it is a simple matter to mark a new gage, using a push-balance on the piston-face to determine actual working tension. This is an additional advantage gained by locating the piston in the side of the torpedo and the spring's head opposite and easily adjustable—that the spring-tension can be so readily tested and the tension-gage verified, the elastic diaphragm of the piston be examined, and the throw of the piston or piston-rod be adjusted, and that no water-chamber requiring bulkheads is needed. The position of the immersion-spring across the torpedo's body permits of a long spring (of great sensibility) and short regulator-chamber, an advantage in torpedoes propelled by compressed air, where the space near the reservoir is limited.

Figure 13:
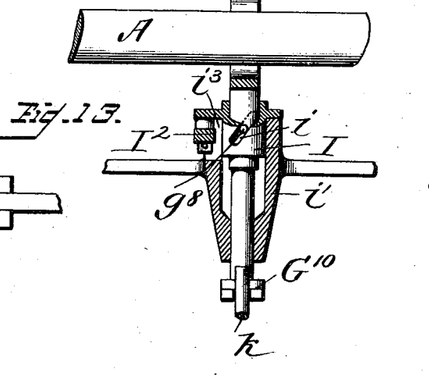
Fig. 13 is a view, partly in cross-section, showing the immersion piston-rod and collar connection on the line 13 13 of Figs. 7, 8, and 9.

Mounted on the piston-rod $G^5$ is a cam-collar I, Fig. 13, having a transverse cam-slot $i$, into which projects a pin $g^8$, mounted on the piston-rod, so that the longitudinal motion of the piston-rod $G^5$ causes the collar to turn by the passage of the pin $g^8$ in the slot $i$. The cam-collar I is held from longitudinal motion on the piston-rod $G^5$ by the support-collars $i'$ and $i^2$ in the cylinder-frame. (See Fig. 9.) One side of the bearing is cut away to enable the cam-collar I to be connected by a link $I^2$ with one arm of a lever or angle-guide $I^3$, pivoted at $i^4$ to the cylinder-frame in such wise that the turning of the collar I, as above described, rocks the angle-guide $I^3$ on its pivot. The angle-guide $I^3$ consists of a bar $I^4$, pivoted as above, having two flat light elastic strips or guide-springs $I^5$ $I^5$ (see Figs. 11 and 12) fastened to one end of the bar $I^4$ on each side and forming projecting ledges along the inner face of the same. Small lugs $i^5$ $i^5$ on the guide-springs $I^5$ engage with the sides of the bar $I^4$ to prevent the approach of the free ends of the guide-springs, but allow them to separate or bend out. The groove thus formed on the face of the angle-guide $I^3$ serves as a guide to a pin J, projecting from a pallet J', pivoted at $j$ in a recess $J^2$ in the horizontal or driving rudder tiller-rod $J^3$. The pin J projects through a radial slot $j^2$ in one side of the recess $J^2$ of the horizontal rudder tiller-rod $J^3$, which slot is of sufficient length to allow of a limited play of the pallet J′ about its pivot. It follows that when the angle-guide I³ is rocked by the link-and-collar connections I² I the pallet J′ is also rocked about its pivot through the engagement of its pin J′ in the guideway formed by the springs I⁵ of the angle-guide I³. The pallet J′ is also rocked about its pivot by the following device: On the extreme end of the piston-rod G⁵ is rigidly mounted at right angles thereto a forked lever G¹⁰, Figs. 6 and 7, which engages with a pin K, secured to a cross-head K², vertically adjustable on the pendulum K, mounted to swing in the direction of the longer axis of the torpedo. When the pendulum K oscillates, the lever G¹⁰ is turned, the pin K sliding between the prongs of the fork. This causes the piston-rod G⁵ to turn and with it the cam-collar I, link I², angle-guide I³, and pallet J′, as before stated. The swing of the pendulum K is delayed more or less and the jar lessened by the spring-stops k′, set in a recess in the pendulum-bob K′, (see Fig. 5,) which bring up against the buffers k² k². In this way the spring-stops k′ serve to adjust the angle of the pendulum with the torpedo axis to produce the pendulum action on the angle-guide, as above described, when desired. The pendulum action through its pin k and piston-rod lever G¹⁰ is complete when the pendulum is against the buffers k² k². Therefore the stronger the springs of the stops k′ the more the pendulum axis will tip before the pendulum reaches the buffers. k³ k³ are the roller-supports on each side of the bob. It is thus seen that the pallet J′, mounted in the horizontal immersion-rudder tiller-rod J³, can be rocked by the piston-rod G¹⁰, the rod being actuated either by its longitudinal motion due to the in-and-out movement of the piston G, or by its rotary motion, due to its engagement with the longitudinally-swinging pendulum K, and this without any effort of the piston or pendulum working one against the other; but one may dominate the other in its effect on the angle of deflection given to the angle-guide I³, and consequently to the pallet J′. This relative angular effect is adjusted by the throw of the piston and piston-rod G⁵ and the angle of the cam-slot i³ in the collar I and by the throw of the pendulum K and the position of the pendulum-pin k in the piston-rod lever G¹⁰.

Movement is imparted to the tiller-rod J³ by the engagement of the pallet J′ with the lower teeth l or l′ of either one or the other of the two stepped impulse-racks L and L′, Figs. 4, 5, 7, 8, 9, and 11, which slide longitudinally in the frame L², alternately approaching and receding from each other. The risers of these racks stand at relatively different levels facing each other. The racks are attached to plates L³ L⁴ and the plate L³ to a longitudinal connecting-bar L⁹. The bar L⁹ and plate L⁴ carry projecting pins, with rollers l³ l⁴, engaging at opposite points in an oval peripheral cam-groove l⁵ in a cam-wheel L⁵, which is mounted on a shaft L⁶, rotated by a worm-gear L⁷, meshing with a worm L⁸, mounted on the propeller-shaft A. The racks L L′ are further maintained in line with each other by a lug l² on the bar L⁹, moving in longitudinal slots l⁶ in the frame L² and plate L⁴. (See Fig. 11.)

L⁷ is a slot in the frame L² to permit of the longitudinal movement of the roller l⁴. It is thus seen that a half-revolution of the cam-wheel L⁵ gives one complete impulse to the racks, drawing them toward each other at the less diameter of the cam-groove l⁵ and separating them at the point of greater diameter.

The impulse-racks L L′ are caused to alternately approach and recede from each other, so that if during an impulse when one end of the pallet J′ is engaged, say, with the rack L, and it is carried in one direction, should the angle-guide I³ alter its position enough to tip the pallet when freed from the rack L the other rack L′ shall be in position at once to engage the other end of the pallet and no impulse be lost. With the racks L L′ at their normal downward position the pallet J′ stands underneath and between them and at level or at such angle as is given to it by the piston G and pendulum K, acting through the angle-guide I³. As the racks are drawn together by their pins l³ l⁴, working in the cam-groove l⁵ of the cam-wheel L⁵, the pallet J′ engages in the first deepest tooth of the rack, if the pallet be tipped at a large angle and is pushed the full throw; or if it has a less angle it engages another tooth and transmits less movement to the horizontal rudder tiller-rod J³, in which it is mounted, and to the horizontal rudder. The rudder effect is thereby graded according to the demand of the piston G and pendulum K. The teeth l l′ on the racks are cut at a varying angle to allow for the angle of the bevel on the end of the pallet when tipped to each tooth. (See Fig. 7.) The horizontal rudder tiller-rod J³ is connected to the rudder J⁵ through an adjustable tension-spring J⁴. (See Figs. 2, 14, and 15.) It consists of a cylinder case J⁶, having adjustable bearings j⁴ j⁵, through which slides the stem of the rod J³. The central part of the cylinder has two or more projecting guides forming grooves j⁶, in which slide the feathers j⁷, secured to the rod J³. Loose collars j⁸ j⁹, free to slide in the cylinder J⁶, rest against the heads of the feathers j⁷ on the rod J³. Two springs J⁷ J⁸ surround the tiller-rod and abut against the bearings j⁴ j⁵ and the collars j⁸ and j⁹. When the rudder tiller-rod J³ is pushed aft, the feathers j⁷ carry with them the plate j⁸ and compress the spring J⁷ against the bearing j⁴. When the rod is pulled forward, the spring J⁸ is compressed in a similar manner. The tension of the springs is set by screwing in or out the bearings j⁴ j⁵. In this way the amount of effort for up-rudder or down-rudder can be adjusted, and should the pallet be engaged with the rack for down-rudder when the torpedo strikes the water one of the springs can yield and avoid shocks to the mechanism.

In place of the straight connection between the rod $J^3$ and the rudder $J^5$, I may provide a curved knuckle connection $J^{10}$ (shown in dotted lines in Fig. 2) and apertures $j^{10}$ in the rudder $J^5$ for adjusting the throw of the rudder.

To steady the pendulum K on entering the water and thereafter to prevent its inertia from causing undue action on the immersion-rudder as the torpedo gathers speed, I provide an immobilizer attachment or pendulum-locking devices to the rod F, controlled by the speed-regulator, as already described. This consists (see Figs. 4, 5, and 6) of a throw-lever $F'$, pivoted to the cylinder-frame and adjustable in its throw by means of the link $F^2$, pivoted to the pitch-frame rod F and vertically adjustable to the throw-lever $F'$ by means of the pin $f$ and holes $f'$. The extremity of the throw-lever $F'$ carries a pin $f^2$, which engages in the slot $f^3$ of the lever-arm $F^3$ of the cam-buffer $F^4$, pivoted on one of the pendulum-buffers $k^2$. (Shown in Figs. 4, 5, and 6 on the rear buffer of the pendulum.) The peripheral edge of the cam-buffer $F^4$ is of such shape that when the rod F is forward and the pitch-frame C at the beginning of the cam-groove $b$ the cam-buffer bears against the bob $K'$ of the pendulum and the latter is chocked forward. As the pitch-frame C and rod F move aft the link $F^2$ pulls the throw-lever $F'$ back and the pin $f^2$ in the slot $f^3$ of the lever-arm $F^3$ turns the cam-buffer $F^4$ and releases the pendulum. The edge and periphery of the cam-buffer can be varied to hold the pendulum in any position of its throw at any time of movement of the pitch cam-wheel B and to ease the pendulum back to its normal position.

Figure 7:
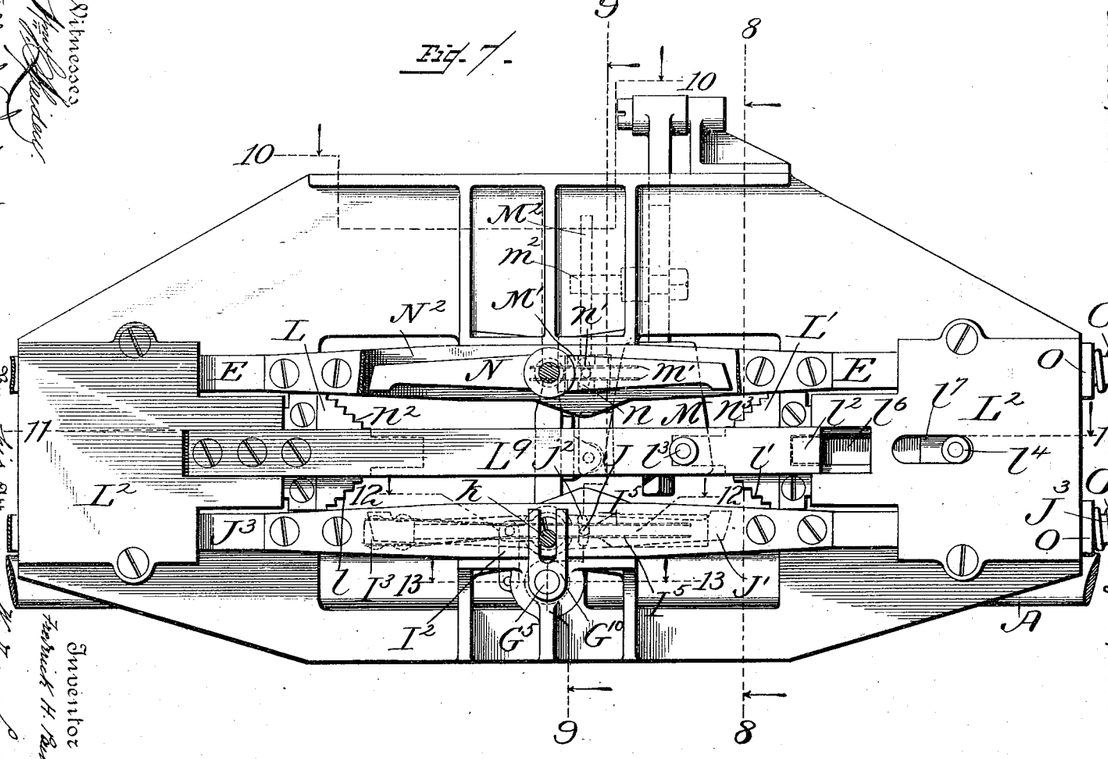
Fig. 7 is an enlarged side elevation of the immersion-impulse rack and connections on the line 7 7, Figs. 5, 6, and 10.
Figure 11:
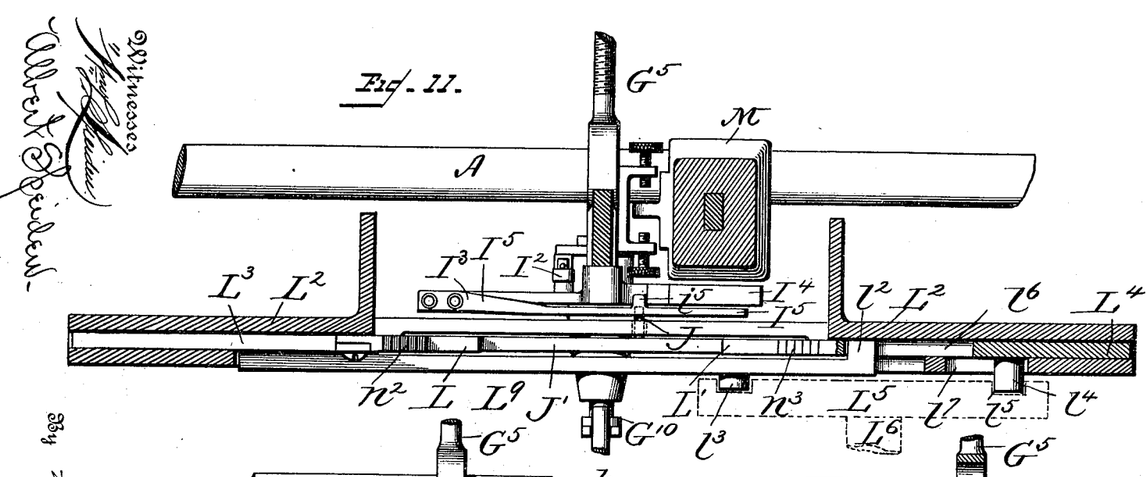
Fig. 11 is an enlarged horizontal longitudinal section of the same on the lines 11 11, Figs. 7, 8, and 9.
Figure 12:
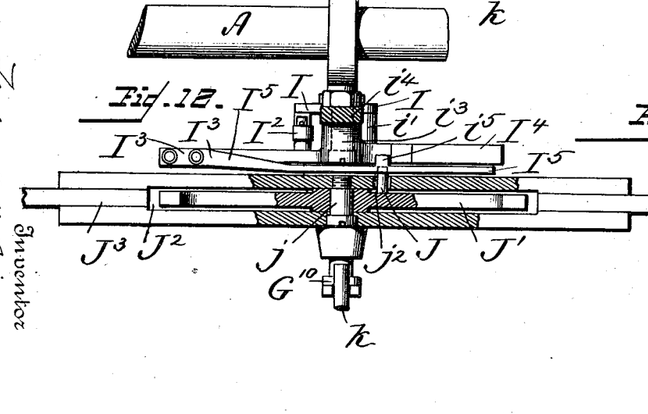
Fig. 12 is a horizontal longitudinal section of the same on the line 12 12 of Figs. 7, 8, and 9.

The operation of the immersion-regulating device is as follows: The spring H having been previously set at a tension corresponding to the hydrostatic pressure at the depth at which the torpedo is intended to run and the pendulum K chocked forward by the pitch-frame rod F and its immobilizing attachment consisting of the cam-buffer $F^4$, as previously described, the torpedo is launched. After striking the water, the shock to the immersion-rudder being taken up by the rudder-spring $J^7$, the pitch cam-groove $b$ has drawn back the pitch-frame C and with it the pitch-frame rod F, releasing the pendulum K. The torpedo being above the set depth, the piston G is out, being so held by the pressure of the spring H and lever $H'$. The piston-rod $G^5$ is also thrown out and its pin $g^8$ near one end of the cam-slot $i$ of the cam-collar I. This has turned the angle-guide $I^3$ so as to tip the pallet $J'$, mounted in the tiller-rod $J^3$, into engagement with the rack $L'$ of the impulse movement in such manner as to produce a certain amount of down-rudder, causing the torpedo to incline point downward and dive. In so doing the pendulum K swings forward and at a given angle to the torpedo axis. The effect through its pin $k$ in the piston-rod lever $G^{10}$ is to turn the collar I and angle-guide $I^3$ until the pallet $J'$ is thrown into engagement with the other rack L in such a manner as to produce a certain amount of up-rudder, thereby checking the torpedo's dive and limiting said dive to any given angle. It is evident that the turning effect of the pendulum K on the piston-rod $G^5$ and collar I in the given angle of oscillation is greater than the turning effect of the piston-rod's longitudinal movement on the collar, due to the gradually-increasing depth, and consequently that the movement of the pendulum dominates that of the piston. It is also evident that in some point in the said oscillation of the pendulum the opposite effects of the out piston and forward pendulum on the collar I, and consequently on the angle-guide, must be equal and neutralize each other, so that the pallet $J'$ will lie in its normal position, as above described, and neither up nor down rudder would occur, and that the torpedo can dive unchecked at such angle of its axis to the pendulum until the relative position of the piston and pendulum changes either by the torpedo's approaching near or passing its set depth and consequent longitudinal movement of the piston-rod or by a change in the angle of the torpedo-axis and consequent rotation of the piston-rod by the oscillation of the pendulum. When the torpedo is below the set depth and points downward, the turning effect of the piston-rod, the piston being now in, and of the pendulum (which is still forward) on the cam-collar of the angle-guide, is to tip the pallet $J'$ into engagement with the impulse-rack L and produce a full up-rudder action. When the torpedo is above the set depth and points up, the opposite effect is produced from that last-described—*i. e.*, the piston out and pendulum back operating to engage the pallet with the rack $L'$ to produce full down-rudder movement. When the torpedo is below the set depth and points up, the back pendulum dominates the piston, operating to engage the pallet with the rack L to produce up-rudder movement, and the angle of unchecked rise can be likewise adjusted at will. In this wise the torpedo quickly arrives at its set depth, in which, its axis being parallel with the surface of the water and its piston in its normal positon, the pin of the piston-rod is in such a position in the guide-angle collar that the pallet is held out of engagement with the impulse mechanism and there is no further longitudinal or rotary movement of the piston-rod tending to throw it into engagement therewith until any change in the immersion or angle of the torpedo axis arises from any cause. While the total turning effect is produced on the angle-guide at certain angles of the torpedo axis above and below the set depth, as previously described, it need not be relatively transmitted to the pallet $J'$ and the impulse-rack, which might cause a too great rudder movement; but the pallet can at the extreme throw desired rest on the extended lower tooth of the impulse-rack, as shown in Figs. 7 and 11, or be otherwise stopped, while the angle-guide continues still to turn, one of its light guide-springs yielding on the pallet-pin. The guide-springs $I^5$ are so light that the angle-guide is always free to assume any new position due to the combined effect of the pendulum and piston, even when the pallet is in engagement with the impulse mechanism, the pallet-pin J sliding between the springs, which yield easily if the angle changes while the pallet is engaged, but have sufficient strength to throw the pallet, with its pin, when released from the rack instantly against the opposite spring without subsequent vibration and in readiness to engage the impulse-rack for such effect on the rudder as the angle-guide defines.

The pallet, which is nicely balanced, the balanced angle-guide, and the light piston-rod in their bearings produce the only friction and work the pendulum and piston have to perform in defining the position of the angle-guide at each instant. To this may be added the extremely small tension of the angle-guide spring when it yields during an impulse and until the normal position is returned to. It is also observed that the weight of the pendulum and the piston are never opposed to each other or bear any relation to each other as to effort, but only in the angular effect on the small balanced angle-guide, which is the directing-lever of the mechanism. This work is extremely small, and hence a light pendulum and small piston can be used, permitting the use of a long and comparatively light immersion-spring of great sensibility to small changes of hydrostatic pressure, due to alteration of the torpedo's depth.

It is evident that the piston and piston-rod may be located in any part of the torpedo-body and its movement be communicated to the angle-guide by suitable lever connection; but I prefer to locate it in the aft section and on the side of the cylinder for the reasons already stated.

It is also evident that in place of connecting the collar with the angle-guide by means of a link $I^2$, as shown in Figs. 7 and 10 to 13, the hub of the angle-guide may form the cam-collar and by passing the piston-rod $G^5$ therethrough impart the requisite motion to the angle-guide and pallet without departing from the spirit of my invention.

Figure 8:
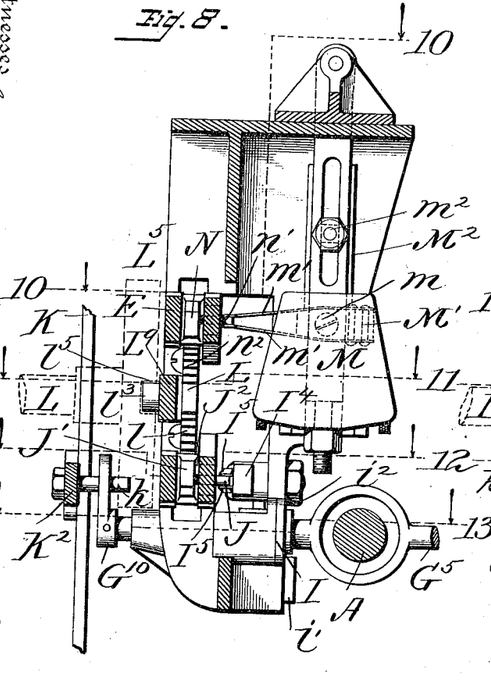
Figs. 8 and 9 are vertical cross-sections of the same on the lines 8 8 and 9 9, respectively, of Figs. 7 and 10.
Figure 9:
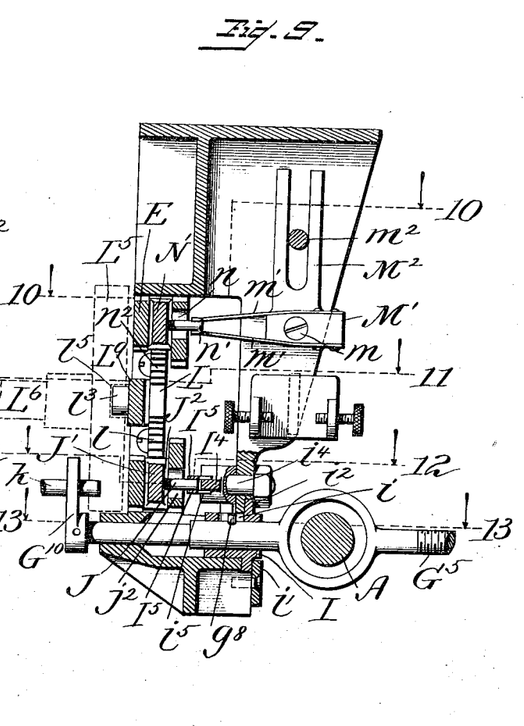
Figure 10:
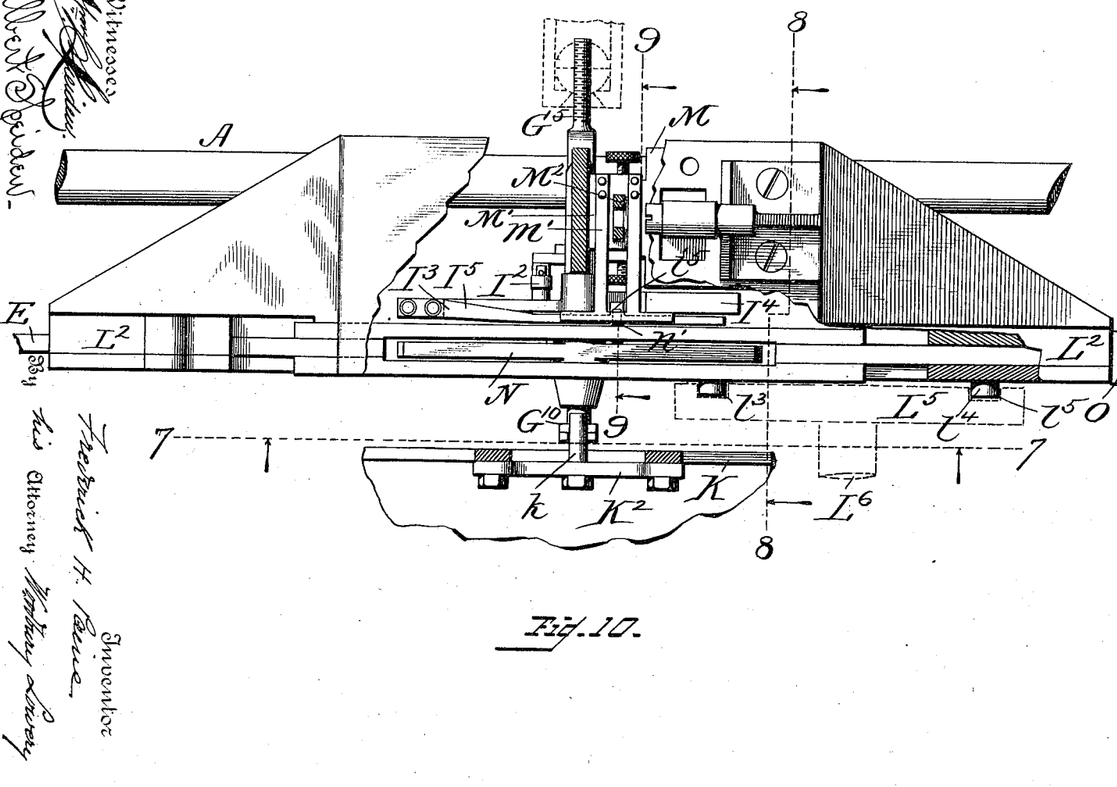
Fig. 10 is a top plan view, partly in section, of the same on the line 10 10 of Figs. 7, 8, and 9.

In Figs. 7 and 8 I have shown an arrangement of pendulum and angle-guide adapted to actuate the rods of vertical rudders for steering a torpedo having the axis of gyroscopic force at right angles to the longitudinal axis of the torpedo on an even keel, and consequently in a straight course in the horizontal plane, the effect of vertical rudders in such case being to restore the torpedo to an even keel when rolled by a deflecting force, the gyroscopic force then keeping the torpedo in a straight line as the line of least resistance to said force, as described in Letters Patent No. 121,052, granted John A. Howell, November 21, 1871, above referred to.

M is a pendulum having a swing transverse to the longer axis of the torpedo.

M' is the angle-guide, pivoted at $m$ to the torpedo-frame and having the guide-springs $m'\ m'$. $M^2$ is the vertical angle-guide lever secured to the same and engaging the adjustable pin $m^2$ on the pendulum, by which movement is imparted to the angle-guide about its pivot.

N is the pallet pivoted to the tiller-rod E of the vertical rudders $E^4$. (See Fig. 2.)

$N^2$ is the recess in the tiller-rod E, and $n$ the radial slot in the rod, in which moves the pin $n'$ of the pallet, which engages with the guide-springs $m'\ m'$ of the angle-guide M'.

$n^2 n^3$ are the upper teeth on the impulse-racks L L', through which the impulse is imparted to the vertical tiller-rod E to actuate the same. The tiller-rod E (see Figs. 2 and 3) connects by a pivoted joint E' with a lever-arm $E^2$, rigidly secured to the vertical-rudder pivot $E^3$ of the vertical rudders $E^4$.

The operation of this part of my invention is as follows: When the torpedo is rolled by a force exterior to it acting upon its gyroscopic force, the transverse swing of the pendulum M imparts a proportionate motion to the angle-guide M', which in turn communicates a corresponding angle to the pallet N, causing it to engage with the teeth $n^2\ n^3$ on the racks L L' to produce impulses of the vertical rudders $E^4\ E^4$, acting oppositely on said gyroscopic force, so as to roll the torpedo back to an even keel, when the pendulum M again becomes vertical and the angle-guide M' adjusted to prevent the pallet N from engaging the impulse-racks. The amount of vertical-rudder throw can be proportioned for any angle of roll.

O O are one form of return-springs, mounted on the tiller-rods $J^3$ and E and compressed between a head $o\ o$ on the rods and their bearings $o'\ o'$ on the torpedo-frame, (see Fig. 1,) by which the rods and their rudders are brought into exact normal relation. The resistance of the water also brings the rudders to their normal position or near it, and the springs assure the exact position.

While I have shown the graded impulse device as applied to the control of a horizontal rudder, it is evident that the same may be applied to a rudder set at any angle to the normal horizontal plane of the torpedo or boat without departing from the spirit of my invention.

Having thus described my invention, what I claim as new, and desire to secure by Letters Patent, is—

1. In a marine torpedo, the combination, with a rudder tiller-rod, of a pallet pivoted thereon, a stepped rack adapted to engage with the pallet to graduate the impulse given the tiller-rod according to the angle given the pallet, gear for reciprocating the rack, a hydrostatic piston, and suitable transmitting connections between the piston and the pallet, whereby the piston movement varies the angle of the pallet, substantially as described.

2. In a marine-torpedo-immersion-regulating device, the combination of a hydrostatic piston, a longitudinally-moving rod actuated by the piston, a cam-collar mounted on the rod and having a transverse cam-slot engaging with a pin on the rod, a pivoted angle-guide having yielding spring-guides, as described, and a suitable connection between the cam-collar and angle-guide, whereby the movement of the piston varies the throw of the angle-guide, substantially as described.

3. In a marine torpedo, the combination, with a rudder tiller-rod, of a hydrostatic piston, a longitudinally-moving rod actuated by the piston, a cam-collar mounted on the rod and having a transverse cam-slot engaging with a pin on the rod, a pivoted angle-guide having yielding spring-guides, as described, a suitable transmitting connection between the cam-collar and angle-guide, a pallet pivoted to the rudder tiller-rod and having a pin engaging between the yielding spring-guides of the angle-guides, a stepped rack adapted to engage with the pallet, and gearing for reciprocating the rack, substantially as described, for the purpose set forth.

4. The combination, with a rod having a longitudinal motion, of a device for communicating such motion to the rod, a cam-collar mounted on the rod and having a transverse cam-slot engaging with a pin on the rod, a pivoted guide-lever having guide-spring strips fastened opposite each other to one end of the lever and forming a yielding guide extending along the face of the same, a suitable connection between the cam-collar and the angle-guide, a pallet pivoted to a rudder tiller-rod and having a pin engaging between the yielding spring-guides and an impulse-rack to engage with the pallet, and gear for driving the rack, whereby when the rod is moved longitudinally the pallet is thrown into engagement with the impulse-rack and the impulse is communicated to the tiller-rod, substantially as described.

5. In a marine torpedo, the combination, with a rudder tiller-rod, of a duplex pallet pivoted thereon, impulse mechanism consisting of two stepped reciprocating racks, the risers of which stand at relatively different levels facing each other, mechanism for alternately causing the racks to approach and recede from each other, a hydrostatic piston, and suitable transmitting connections between the piston and the duplex pallet, substantially as and for the purpose set forth.

6. In a marine torpedo, the combination, with a rudder tiller-rod, of a pallet pivoted thereon, a stepped rack adapted to engage with the pallet, as described, mechanism for reciprocating the rack, a pendulum, and suitable transmitting connections between the pendulum and the pallet, whereby the movement of the torpedo-body relatively to the pendulum varies the impulse imparted to the tiller-rod, substantially as described.

7. In a marine torpedo, the combination, with a rudder tiller-rod, of a duplex pallet pivoted thereon, impulse mechanism consisting of two stepped reciprocating racks, as described, mechanism for alternately causing the racks to approach and recede from each other, a pendulum, and suitable transmitting connections between the pendulum and the pallet, substantially as described.

8. In a marine torpedo, the combination, with a rudder tiller-rod, of a pallet pivoted thereon, a stepped rack adapted to engage with the pallet at different angles assumed by the latter, a pivoted angle-guide having yielding spring-guides engaging with a pin on the pallet, a longitudinally moving and rotating rod, a cam-collar mounted on the rod and having a transverse slot engaging with a pin on the rod, a suitable connection between the collar and the angle-guide, a hydrostatic piston, and transmitting connections between the piston and the rod to impart a longitudinal movement to the latter, a pendulum, and suitable transmitting connections between the pendulum and the longitudinally-moving rod, substantially as and for the purpose described.

9. In a marine torpedo, the combination, with a rudder tiller-rod, of a pallet pivoted thereon, a stepped rack adapted to engage with the pallet at the different angles assumed by the latter, and suitable gear driven by a worm on the propeller-shaft to reciprocate the rack, substantially as described.

10. The combination of the piston G, located in the side of the torpedo, the piston-rod $G^5$, secured by a ball-and-socket joint to the piston and having the pin $g^8$, the cam-collar I, mounted on the piston-rod and having the transverse cam-slot $i$, engaging with the piston-rod pin, the pivoted angle-guide $I^3$, having the guide-springs $I^5 I^5$, as described, a suitable connection between the cam-collar and the angle-guide, the pallet J', pivoted to the rudder tiller-rod $J^3$ and having the pin J, engaging with the guide-springs of the angle-guide, the stepped reciprocating racks L L', mounted as described, the oval cam-wheel $L^5$, keyed to the shaft $L^6$ and having the cam-groove $l^5$, engaging at opposite points with the racks, rollers $l^3 l^4$, the worm-gear $L^7$, mounted on the shaft $L^6$, and the worm $L^8$, meshing therewith and keyed to the propeller-shaft A, substantially as described.

11. The combination, with the impulse mechanism consisting of the stepped reciprocating rack L, its plate $L^3$, and longitudinal connecting-bar $L^9$, having the lug $l^2$, the stepped reciprocating rack L, having the longitudinal slot $l^6$ for the lug $l^2$ and its plate $L^4$, the rack-rollers $l^3 l^4$, the oval cam-wheel $L^5$, keyed to the shaft $L^6$ and having the cam-groove $l^5$, engaging at opposite points with the rack-rollers $l^3 l^4$, the worm-gear $L^7$, mounted on the shaft $L^6$, and worm $L^8$, meshing with and keyed to the propeller-shaft A, substantially as described.

12. The combination, with a hydrostatic piston located in the side of a marine torpedo, of a spiral spring extending across the torpedo, a pivoted lever having one arm bearing on the piston and the other arm secured to one end of the spring, and a tension-adjusting device attached to the other end of the spring and extending into a chamber accessible from the torpedo side, substantially as described.

13. The combination of the piston G, the pivoted lever H', having a forked arm $h'$ resting on the piston, the tension-spring H, having one end secured to the lever-arm $h$ and the other end to the adjusting-nut $H^2$, the screw-threaded adjusting-rod $H^3$, passing through said nut and extending into the chamber $H^5$, the notch $h^2$ on the nut $H^3$, in engagement with the guide $h^3$, and cap $H^4$ over the rod-head, substantially as described.

14. The combination, with a hydrostatic piston tension-spring extending across the torpedo, its adjusting-nut $H^2$, and screw-threaded adjusting-rod $H^3$, extending into a chamber $H^5$, located in the torpedo side and having an aperture $h^6$ in its wall, of the tension-gage $H^6$, substantially as and for the purpose set forth.

15. In a marine torpedo, the combination, with a pendulum suspended therein, of a pendulum-immobilizing attachment consisting of a pivoted cam-buffer, a sliding frame, suitable transmitting connection between said cam-buffer and sliding frame, the propeller-shaft, and suitable connection between the shaft and the frame to move the latter, substantially as described.

16. The combination, with the pendulum K, of the pivoted cam-buffer $F^4$, its longitudinally-slotted lever-arm $F^3$, the pivoted throw-lever F', engaging therewith, the link $F^2$, pivoted to the pitch-frame rod F and adjustably connected with the throw-lever, the longitudinally-sliding pitch-frame C, and gear, as described, for moving the pitch-frame, substantially as and for the purpose set forth.

17. The combination, with a rudder tiller-rod, of a cylinder-case having adjustable head-bearings and a central longitudinally-grooved body, the rod passing through said bearings and having feathers sliding in said grooves, and spiral tension-springs contained within said cylinder and located around said rod and between said head-bearings and the heads of the feathers on the rod, substantially as described.

18. In a marine torpedo, the combination, with an automatic speed-regulating device and an automatic immersion-determining device actuated by a pendulum, of a pendulum-immobilizing device, and transmitting connections between it and the speed-regulating device, substantially as described.

19. In a marine torpedo, the combination, with a propeller-shaft having blades pivotally mounted in the propeller-hub, of a pitch-regulating device for rotating the blades about a pitch-varying axis, a pendulum suspended in said torpedo, a pendulum-immobilizing device, a transmitting connection between said pitch-regulating and immobilizing devices, and mechanism driven by the propeller-shaft to control the pitch-regulating device, substantially as described.

20. In a marine torpedo, the combination, with a propeller-shaft having blades pivotally mounted in the propeller-hub, of a sliding frame, transmitting connections between said frame and the propeller-blades, a pendulum, a pendulum-immobilizing device, transmitting connections between said frame and immobilizer, a cam device engaging with the sliding frame, and mechanism driven by the propeller-shaft to actuate said cam device, substantially as described.

In testimony whereof I have hereunto set my hand in the presence of two subscribing witnesses.

FREDERICK HENRY PAINE.

Witnesses:
ROBT. M. HOOPER,
D. T. S. FULLER.